(12) United States Patent
Kawashima et al.

(10) Patent No.: US 7,488,035 B2
(45) Date of Patent: Feb. 10, 2009

(54) AUTOMOBILE SEAT

(75) Inventors: Yoshihito Kawashima, Hiroshima (JP); Toru Takeshima, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 11/485,447

(22) Filed: Jul. 13, 2006

(65) Prior Publication Data
US 2007/0085390 A1   Apr. 19, 2007

(30) Foreign Application Priority Data
Oct. 18, 2005   (JP)   ............... 2005-303156

(51) Int. Cl.
B60N 2/42   (2006.01)
B60N 2/48   (2006.01)
(52) U.S. Cl. ............... 297/216.14; 297/216.12
(58) Field of Classification Search ............ 297/216.12, 297/216.13, 216.14
See application file for complete search history.

(56) References Cited

U.S. PATENT DOCUMENTS

| 2,636,552 | A |   | 4/1953  | Long |  |
|---|---|---|---|---|---|
| 3,838,870 | A |   | 10/1974 | Hug |  |
| 4,358,155 | A | * | 11/1982 | Osterhold et al. | 297/378.11 |
| 5,145,233 | A |   | 9/1992  | Nagashima |  |
| 5,378,043 | A |   | 1/1995  | Viano et al. |  |
| 5,490,706 | A | * | 2/1996  | Totani | 296/68.1 |
| 5,795,019 | A |   | 8/1998  | Wieclawski |  |
| 5,820,211 | A | * | 10/1998 | Heilig et al. | 297/216.12 |
| 5,884,972 | A | * | 3/1999  | Deptolla | 297/378.11 |
| 5,934,750 | A | * | 8/1999  | Fohl | 297/216.12 |
| 6,109,690 | A | * | 8/2000  | Wu et al. | 297/216.13 |
| 7,163,261 | B2 | * | 1/2007 | Kawashima | 297/216.14 |
| 2005/0077763 | A1 | * | 4/2005 | Kawashima | 297/216.14 |

FOREIGN PATENT DOCUMENTS

| CN | 1616274 A | 5/2005 |
|---|---|---|
| EP | 0 627 340 A1 | 12/1994 |
| JP | 2001-39194 | 2/2001 |
| JP | 2001-163097 | 6/2001 |
| JP | 2002-274240 | 9/2002 |
| WO | 87/03256 | 6/1987 |
| WO | 96/06752 | 3/1996 |

* cited by examiner

Primary Examiner—Joseph F Edell
(74) Attorney, Agent, or Firm—Wenderoth, Lind & Ponack, L.L.P.

(57) ABSTRACT

An automobile seat includes a seat cushion, a seat back tiltably mounted on the seat cushion, and a head rest mounted on an upper portion of the seat back. The automobile seat also includes a seat cushion frame, a pair of side frames mounted on the seat cushion frame, and a seat back frame mounted on the pair of side frames so as to be rockable within a limited range of angle. The seat further includes a seat back frame rocking mechanism for causing, when an acceleration greater than a predetermined value is inputted from behind a vehicle body, the seat back frame to undergo a rocking motion, and a rocking motion preventing member for preventing, when the acceleration greater than the predetermined value is not inputted from behind the vehicle body, the seat back frame rocking mechanism from causing the seat back frame to undergo the rocking motion.

11 Claims, 8 Drawing Sheets

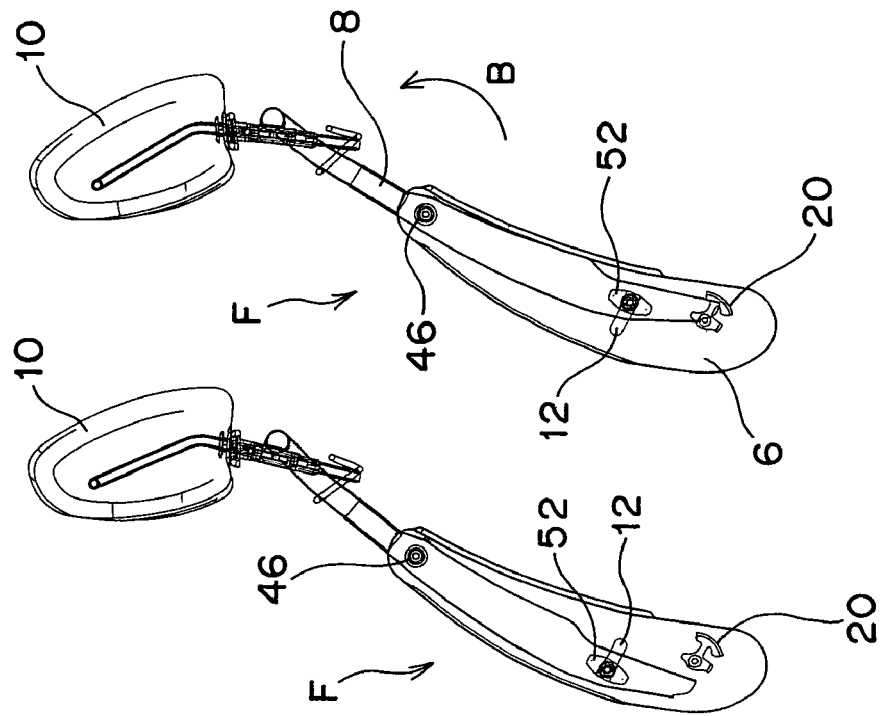
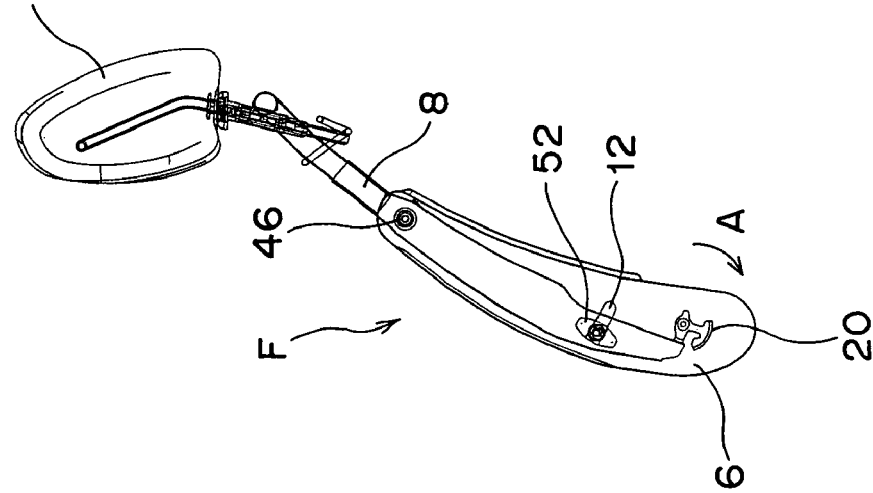

AUTOMOBILE SEAT

BACKGROUND OF THE INVENTION

1. Field of the Invention

The present invention relates to an automobile seat capable of preventing a seat occupant from suffering a whiplash injury when an automotive vehicle has come into a rear-end collision.

2. Description of the Related Art

Automobile seats generally have a headrest mounted on an upper portion of a seat back. When a user sits on a seat, a predetermined clearance is present between the user's head and the headrest, but when an automobile vehicle has come into a rear-end collision, the user's body moves forward, while the user's head remains back. Accordingly, a load is applied to the user's neck, resulting in a whiplash injury.

It is possible to reduce the clearance between the user's head and the headrest to minimize the injury; however, the user's head is often brought into contact with the headrest even in the normal sitting condition, and even a slight movement of the head causes the head to interfere with the headrest, making the user uncomfortable.

A headrest pivotally mounted on a seat back, connected to a pressure portion and always biased rearwards by a coil spring, has been hitherto proposed. When a rear-end collision occurs, the headrest is moved forward by a load inputted to the pressure portion against a biasing force of the coil spring. According to this arrangement, the headrest that has been brought into contact with the head is immediately returned to its original position after the rear-end collision and, hence, a load is also applied to the user's neck (see, for example, Document 1).

Another headrest has been proposed, having a mechanism that acts, in the event of a rear-end collision, to move the headrest forward and hold the headrest at a forward position (see, for example, Document 2 or 3).

Document 1: Japanese Laid-Open Patent Publication No. 2001-39194

Document 2: Japanese Laid-Open Patent Publication No. 2001-163097

Document 3: Japanese Laid-Open Patent Publication No. 2002-274240

The automobile seat as disclosed in Document 2 employs a ratchet mechanism for holding the headrest at the forward position in the event of the rear-end collision. The ratchet mechanism cannot allow the headrest to return to its original position after the rear-end collision. Because the headrest is held at the forward position after the rear-end collision, the impact on the head is reduced to some extent, but it is still insufficient.

The automobile seat as disclosed in Document 3 similarly employs a ratchet mechanism, but this ratchet mechanism is provided with a releasing means that is operable to return the headrest to its original position after the rear-end collision. However, the mechanism is complicated and is hence costly.

Further, when the seat back is inclined rearwardly, if an excessive load is applied to a seat back frame, there is a possibility that a rocking mechanism (whiplash injury-preventing mechanism) may operate unexpectedly.

SUMMARY OF THE INVENTION

The present invention has been developed to overcome the above-described disadvantages, and it is accordingly an objective of the present invention to provide a highly reliable automobile seat of a simple construction. In the event of a rear end collision, the seat is capable of rocking the seat back frame to move the headrest forward to thereby prevent a seat occupant from suffering a whiplash injury. Further, the seat is capable of preventing an erroneous operation of the rocking mechanism under normal conditions, and returning the headrest to its original position after the rear-end collision, wherein a desired clearance is ensured between the head and the headrest in normal conditions.

In accomplishing the above and other objectives, the automobile seat according to the present invention includes a seat cushion frame, a pair of side frames mounted on the seat cushion frame, and a seat back frame mounted on the pair of side frames so as to be rockable within a limited range of angle. The seat further includes a seat back frame rocking mechanism for causing, when an acceleration greater than a predetermined value is inputted from behind a vehicle body, the seat back frame to undergo a rocking motion, and a rocking motion preventing member for preventing, when the acceleration greater than the predetermined value is not inputted from behind the vehicle body, the seat back frame rocking mechanism from causing the seat back frame to undergo the rocking motion. The rocking motion preventing member acts to prevent an erroneous operation of the seat back frame rocking mechanism.

The rocking motion preventing member includes a rotatable base and an inertial portion extending radially outwardly from the base. The base has a stopper that acts to restrict the seat back frame rocking mechanism by contacting a lower end portion of the seat back frame. However, when the acceleration greater than the predetermined value is inputted from behind the vehicle body, the rocking motion preventing member is rotated by an inertia force of the inertial portion, thereby releasing the restriction of the seat back frame rocking mechanism by the rocking motion preventing member.

This construction is relatively simple and can positively hold the seat back frame at a predetermined position under a normal sitting condition. On the other hand, when the acceleration greater than the predetermined value is inputted from behind the vehicle body due to, for example a rear-end collision, the above construction can easily release the restriction of the seat back frame rocking mechanism. Further, because the above construction makes use of the inertia force of the inertial portion, the headrest can easily return to its original position after the rear-end collision.

The automobile seat according to the present invention also includes an elastic member operable to bias the rocking motion preventing member in a first direction in which the rocking motion of the seat back frame is prevented. An elastic force of the elastic member is selected such that when the acceleration greater than the predetermined value is inputted from behind the vehicle body, the rocking motion preventing member is rotated in a direction counter to the first direction, thereby enhancing the reliability of the seat back frame rocking mechanism.

Advantageously, the stopper has an arcuate surface confronting the lower end portion of the seat back frame and a center of curvature that is offset from a center of rotation of the rocking motion preventing member.

With this configuration, when the acceleration greater than the predetermined value is inputted from behind the vehicle body, the minimum distance between the rocking motion preventing member and the lower end portion of the seat back frame increases gradually as the rocking motion preventing member rotates, thus allowing the rocking motion preventing member to rotate smoothly.

After the rocking motion preventing member has released the restriction of the seat back frame rocking mechanism, the rocking motion preventing member is rotated in the first direction by the elastic force of the elastic member. For this purpose, the seat back frame has a lower edge of a predetermined shape that allows the seat back frame to return to its original position before the acceleration greater than the predetermined value is inputted from behind the vehicle body.

The automobile seat according to the present invention further includes a seat back frame holding means operable to hold the seat back frame at a normal sitting position. The seat back frame holding means includes an elastic member having two protrusions formed at opposite ends thereof, respectively, and two depressions formed in the side frame, each of the two protrusions being engaged in one of the two depressions.

When the acceleration greater than the predetermined value is inputted from behind the vehicle body, restriction of the seat back frame rocking mechanism by the rocking motion preventing member is released, and a lower portion of the seat back frame is pushed by a lumbar part of a seat occupant upon a rearward movement of the seat occupant. As a result, the seat back frame is caused to undergo a rocking motion with respect to the side frames, and the headrest is moved forward, making it possible to prevent the seat occupant from suffering a whiplash injury.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein:

FIG. 6A is a side view of the seat back frame in a normal sitting condition;

FIG. 6B is a view similar to FIG. 6A, but depicting a condition when an acceleration greater than a predetermined value has been inputted from behind an automotive vehicle;

FIG. 6C is a view similar to FIG. 6A, but depicting a condition in which a headrest has been moved forwards after the condition of FIG. 6B;

DETAILED DESCRIPTION OF THE PREFERRED EMBODIMENTS

This application is based on an application No. 2005-303156 filed Oct. 18, 2005 in Japan, the content of which is herein expressly incorporated by reference in its entirety.

An automobile seat according to the present invention includes a seat cushion mounted on a vehicle body and a seat back tiltably mounted on the seat cushion.

Figure 1:
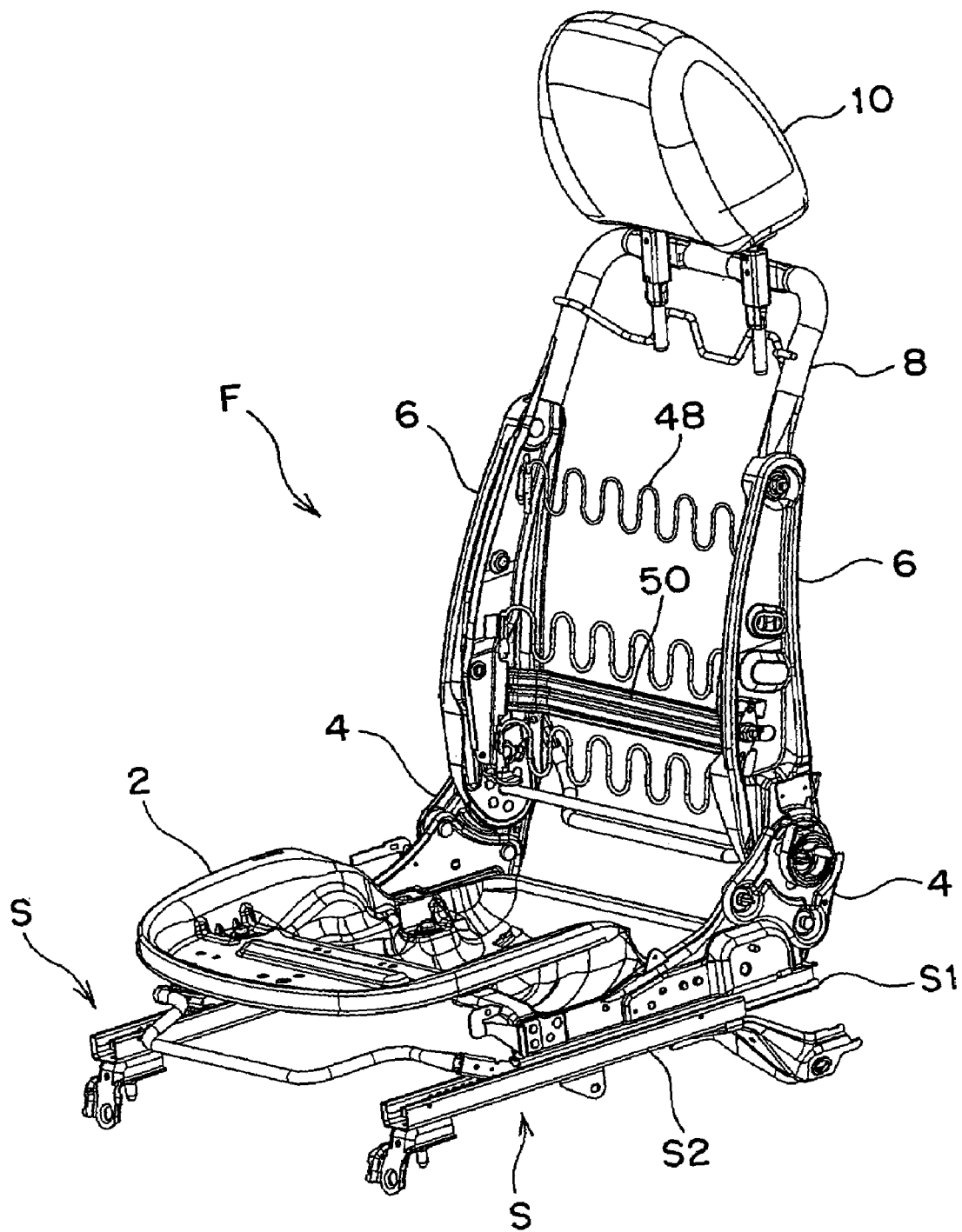
FIG. 1 is a perspective view of a frame of an automobile seat according to the present invention.
Figure 2:
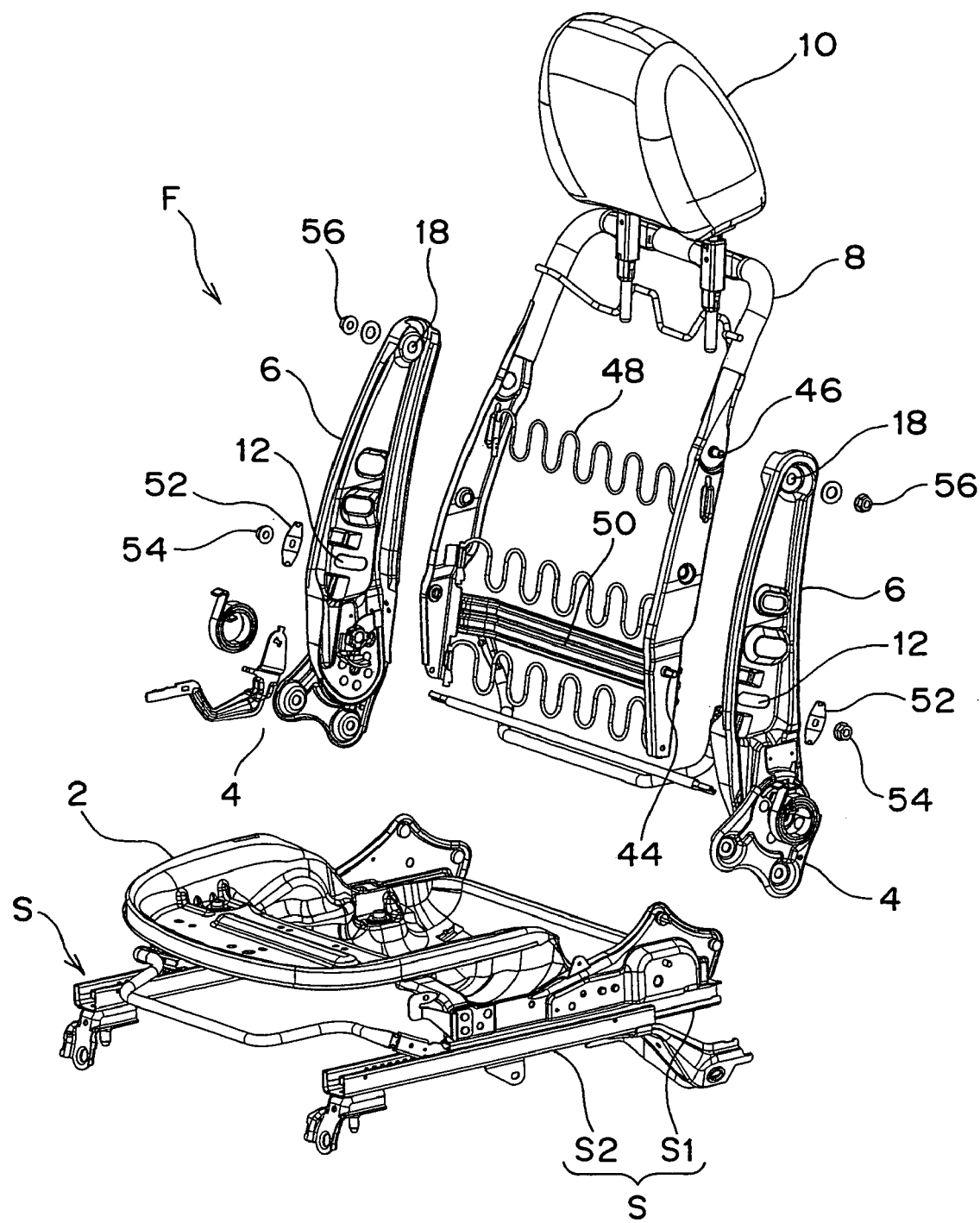
FIG. 2 is an exploded perspective view of the frame of FIG. 1.

FIGS. 1 and 2 depict a frame F of the automobile seat according to the present invention, which includes a seat cushion frame 2, a pair of side frames 6 mounted on a rear portion of the seat cushion frame 2 via respective recliner adjusters 4 so as to be tiltable in the longitudinal direction of the vehicle body, and a seat back frame 8 mounted on the pair of side frames 6 so as to be rockable within a limited range of angle. A vertically movable headrest 10 is mounted on an upper portion of the seat back frame 8. In the example shown in FIGS. 1 and 2, the seat cushion frame 2 is secured to a pair of upper rails S1 each constituting a seat slide unit S that is operable to slide the seat in the longitudinal direction of the vehicle body. A lower rail S2 on which the upper rail S1 is slidably mounted is secured to a vehicle floor.

Figure 3:
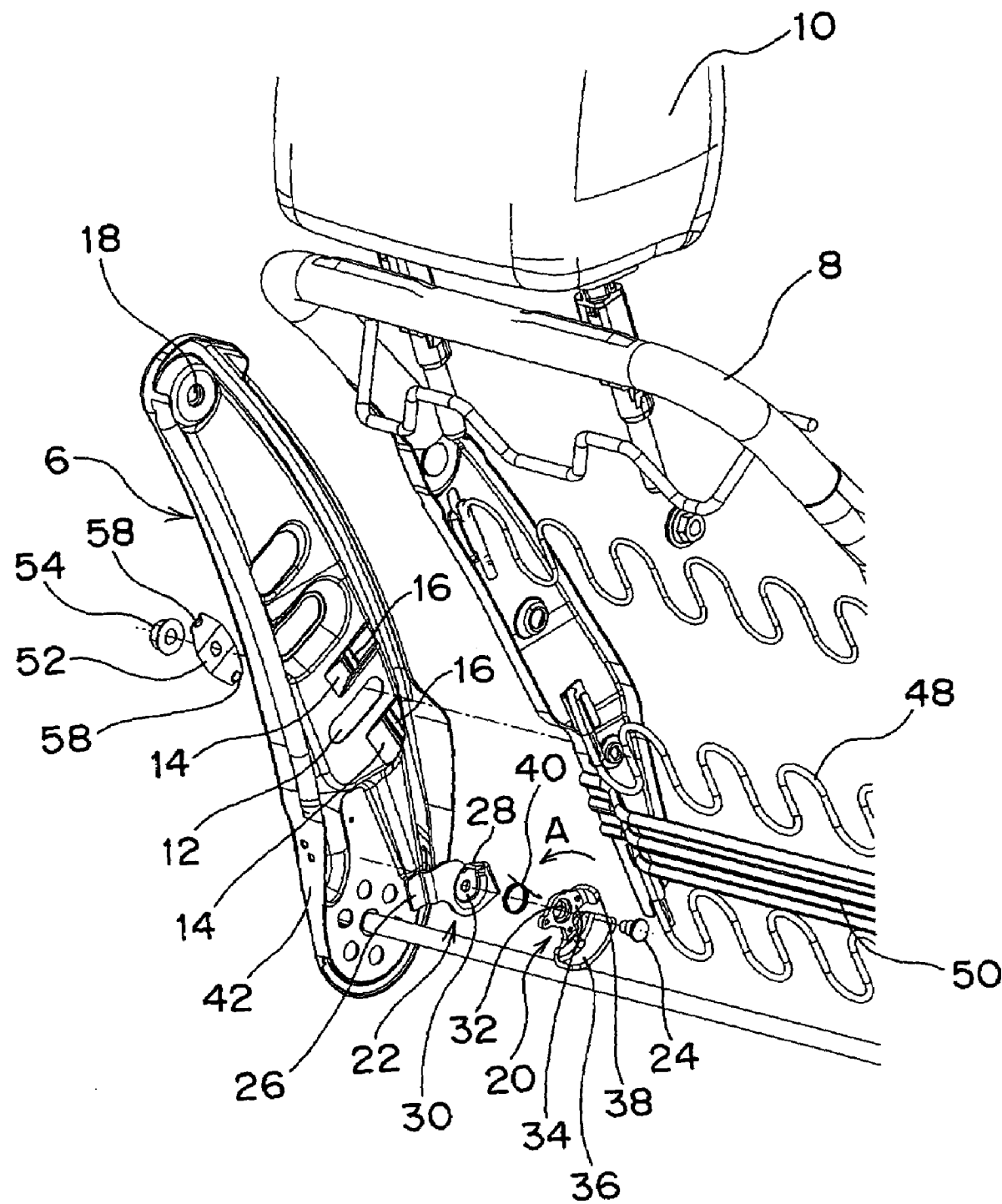
FIG. 3 is an exploded perspective view of a seat back frame rocking mechanism and a rocking motion preventing member both incorporated in a seat back frame constituting the frame of FIG. 1.

FIG. 3 depicts one of the side frames 6 and the seat back frame 8, and the automobile seat according to the present invention is further discussed hereinafter with reference to FIGS. 1 to 3.

A lower portion of each side frame 6 is mounted to an associated one of the recliner adjusters 4. The side frame 6 has a guide groove 12 defined therein, while the seat back frame 8 has opposite side portions each having a bolt (described later) that is secured to a lower portion thereof and inserted into the guide groove 12.

The side frame 6 also has two laterally outwardly protruding ridges 14 formed on respective sides of the guide groove 12 except at a rear end portion thereof so as to extend generally parallel to the guide groove 12. Each of the ridges 14 has a depression (elastic member holding portion) 16 formed at an intermediate portion thereof so as to hold an elastic member (described later). The side frame 6 further has a bolt insertion hole 18 defined therein at an upper portion thereof, and the guide groove 12 referred to above is formed into an arcuate and elongate shape having a center of curvature at the bolt insertion hole 18.

A rocking motion preventing member 20 for preventing a rocking motion of the seat back frame 8 and a guide 22 for guiding the rocking motion preventing member 20 are both mounted on a lower portion of the side frame 6 by means of a pin 24 at a location below the guide groove 12. The guide 22 has a rearwardly protruding portion 26 unitarily formed therewith so as to extend rearwardly towards a rear bent portion 42 that is formed by bending a rear edge of the side frame 6. The guide 22 also has an inwardly protruding portion 28 unitarily formed therewith so as to protrude inwardly (in a direction away from the lower portion of the side frame 6) from an upper edge thereof. The guide 22 further has a recess 30 formed around a pin insertion hole defined therein into which the pin 24 is inserted. On the other hand, the rocking motion preventing member 20 has a base 34 and an inertial portion (weight) 36 unitarily formed with the base 34. The base 34 has an outwardly protruding portion 32 received in the recess 30 in the guide 22, while the inertial portion 36 extends radially outwardly and then inwardly from the base 34. The base 34 also has an inwardly protruding portion 38 formed at a front portion thereof that is brought into contact with a lower end portion of the seat back frame 8 to serve as a stopper for preventing the rocking motion of the seat back frame 8. A spiral spring (elastic member) 40 is interposed between the rocking motion preventing member 20 and the guide 22. One end of the spiral spring 40 is engaged with the guide 22, and the other end of the spiral spring 40 is engaged with the base 34 of the rocking motion preventing member 20, thereby biasing the rocking motion preventing member 20 in a direction of an arrow A in FIG. 3.

Figure 4:
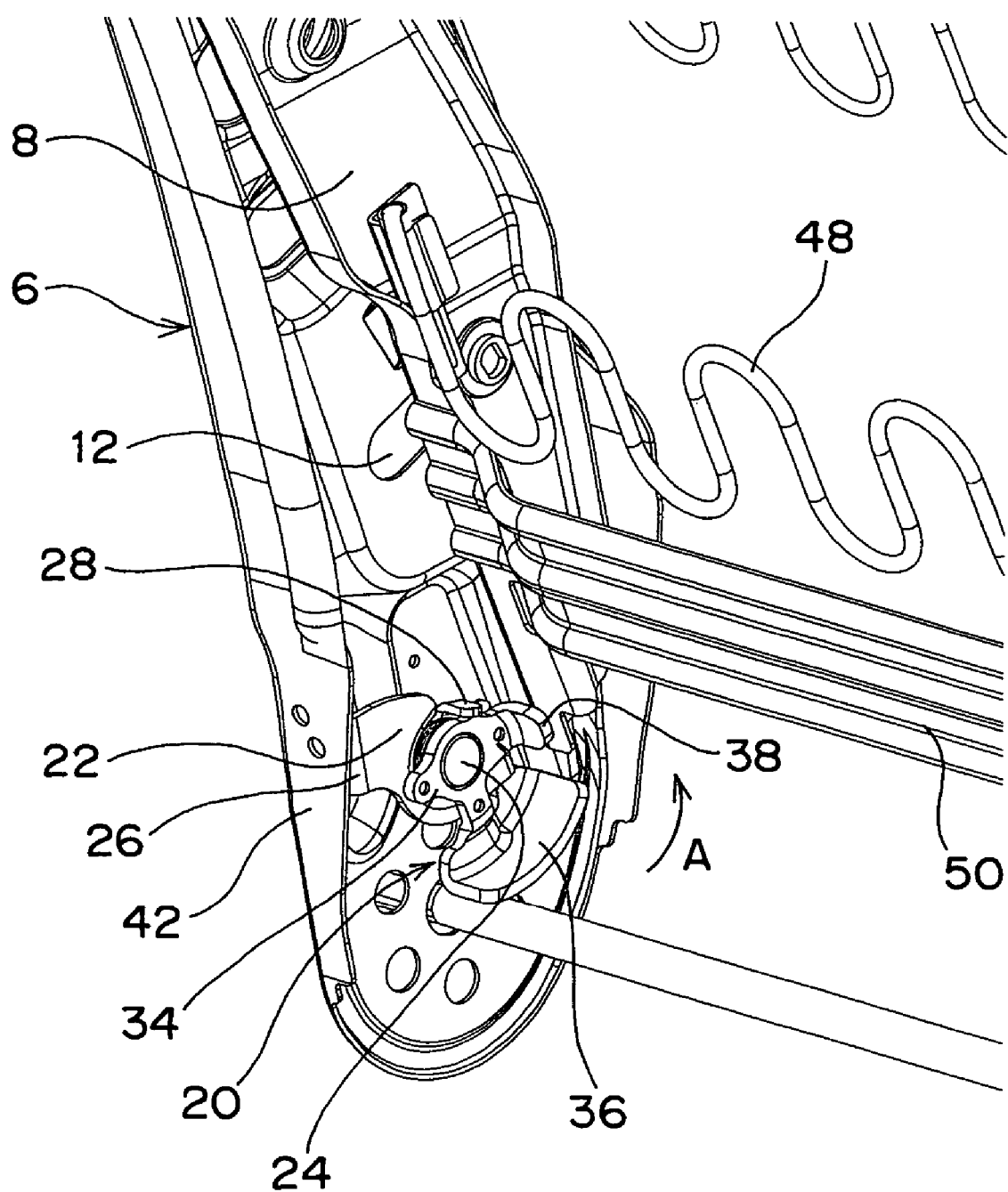
FIG. 4 is a perspective view of the seat back frame rocking mechanism and the rocking motion preventing member of FIG. 3, particularly depicting a condition in which the operation of the seat back frame rocking mechanism is restricted by the rocking motion preventing member.

As shown in FIG. 4, the rocking motion preventing member 20 is rotatably mounted on the guide 22 via the pin 24, and when the rearwardly protruding portion 26 of the guide 22 is joined to the side frame 6, an upper edge of the rocking motion preventing member 20, which is biased in the direction of the arrow A by the spiral spring 40, is brought into contact with the inwardly protruding portion 28 of the guide 22. At this moment, a front surface of the inwardly protruding portion 38 of the rocking motion preventing member 20 is spaced slightly (a predetermined clearance) away from the lower end portion of the seat back frame 8.

On the other hand, the seat back frame 8 having the headrest 10 mounted on an upper portion thereof is formed into an inverted "U" shape, and includes a first bolt 44 secured thereto at a location confronting the guide groove 12 in the side frame 6 so as to protrude towards the guide groove 12. The seat back frame 8 also includes a second bolt 46 secured thereto at a location confronting the bolt insertion hole 18 in the side frame 6 so as to protrude towards the bolt insertion hole 18. As explained later, the second bolt 46 acts as a center of rotation about which the seat back frame 8 undergoes a rocking motion within a limited range of angle.

The seat back frame 8 further includes a plurality of S-shaped springs 48 connected at opposite ends thereof to opposite side portions of the seat back frame 8. A pressure plate 50 is interposed between two of the S-shaped springs 48 positioned at a lower portion of the seat back frame 8 so as to confront the lumbar part of a seat occupant. As is the case with the S-shaped springs 48, the pressure plate 50 is connected at opposite ends thereof to the opposite side portions of the seat back frame 8.

When the seat back frame 8 is mounted on the side frame 6, the first bolt 44 is inserted into the guide groove 12 in the side frame 6 and into a center hole defined in a generally oval or rhombic elastic member 52 such as a plate spring, while the second bolt 46 is inserted into the bolt insertion hole 18 in the side frame 6. Thereafter, a first nut 54 is screwed onto the first bolt 44, while a second nut 56 is similarly screwed onto the second bolt 46.

The elastic member 52 has two protrusions 58 unitarily formed therewith at opposite ends thereof, respectively, so as to protrude towards the side frame 6. Each protrusion 58 has a cross-sectional shape complementary to that of the depression 16 in the ridge 14 formed on the side frame 6, and when the first nut 54 is screwed onto the first bolt 44, the protrusion 58 is engaged in the depression 16 in the ridge 14. At this moment, the first bolt 44 is positioned at a front end of the guide groove 12.

With respect to the rocking motion preventing member 20, the front surface of the inwardly protruding portion 38 formed at a front portion of the base 34 is spaced slightly away from the lower end portion of the seat back frame 8, as described above, and the inertial portion 36 is positioned below the base 34 (see FIG. 4).

When the automobile seat of the above-described construction is in the normal sitting condition as shown in FIG. 6A, each protrusion 58 of the elastic member 52 is engaged in and held by the depression 16 in one of the ridges 14 formed on the side frame 6, thereby preventing the rocking motion of the seat back frame 8 (restricting a seat back frame rocking mechanism). Accordingly, the seat back frame 8 is fixed to the pair of side frames 6, and the upper part of the user's body is supported by the seat back frame 8. The headrest 10 mounted on the upper portion of the seat back frame 8 is spaced a predetermined distance away from the user's head.

That is, the ridges 14, the elastic member 52 and the like serve as a seat back frame holding means for holding the seat back frame 8 at the normal sitting position (initial position).

On the other hand, where an acceleration greater than a predetermined value is inputted to the seat from behind in the event of, for example, a rear-end collision, the seat is moved forwards together with the vehicle body, while the inertial portion 36 of the rocking motion preventing member 20 stays at its present position by the action of its inertia force. Accordingly, as shown in FIG. 6B, the rocking motion preventing member 20 rotates in a direction counter to the direction of the arrow A against an elastic force of the spiral spring 40, thereby releasing the restriction of the seat back frame rocking mechanism.

Figure 7:
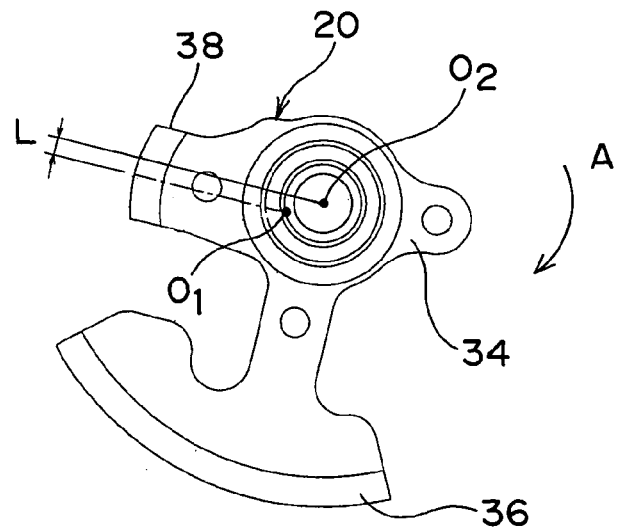
FIG. 7 is a front view of the rocking motion preventing member.
Figure 8:
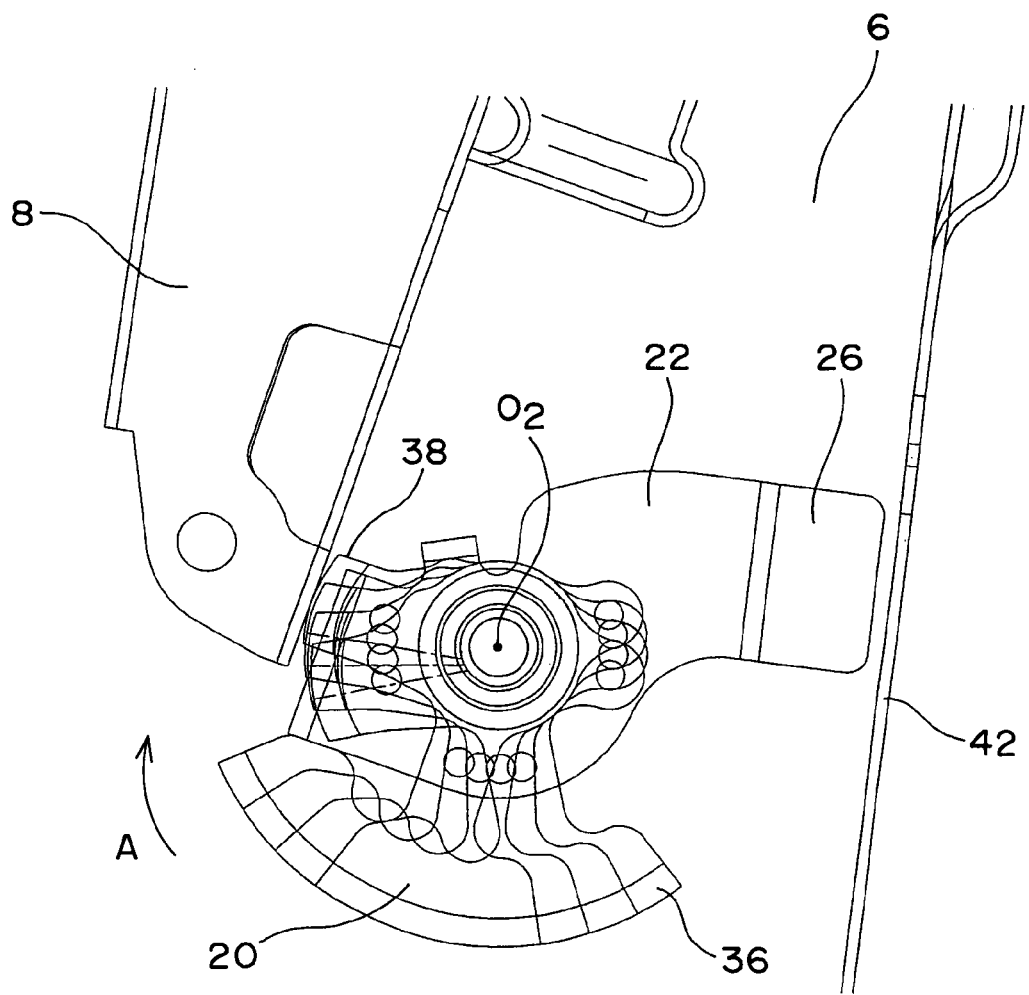
FIG. 8 is a front view of a portion of a side frame when the rocking motion preventing member is releasing the restriction of the operation of the seat back frame rocking mechanism.

As shown in FIG. 7, the inwardly protruding portion 38 of the rocking motion preventing member 20 is formed into an arcuate shape, and the front surface thereof confronting the lower end portion of the seat back frame 8 has a center of curvature $O_1$ that is offset a predetermined length L below a center of rotation $O_2$ of the rocking motion preventing member 20. Accordingly, as shown in FIG. 8, as the rocking motion preventing member 20 rotates in the direction counter to the direction of the arrow A, the minimum distance between the rocking motion preventing member 20 and the lower end portion of the seat back frame 8 increases gradually, thus allowing the rocking motion preventing member 20 to rotate smoothly.

Figure 5:
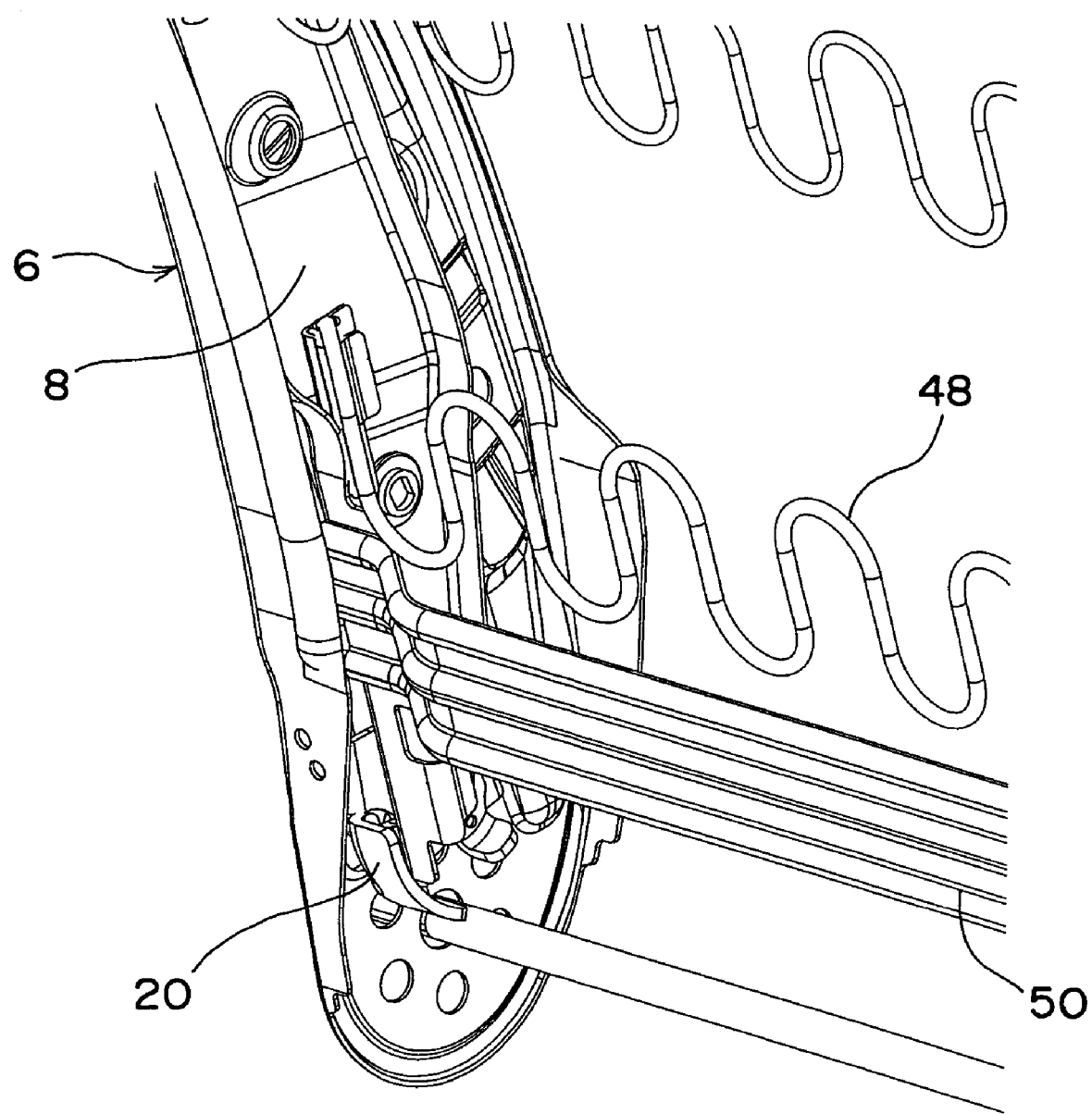
FIG. 5 is a view similar to FIG. 4, but depicting a condition in which the restriction of the operation of the seat back frame rocking mechanism by the rocking motion preventing member has been released.

At this moment, the user's body is pressed to the seat back, and a rearward movement of the user's body causes the lumbar part to push the pressure plate 50 rearwards, and upon deformation of the elastic member 52 each protrusion 58 of the elastic member 52 leaves the depression 16 in the ridge 14. As a result, the elastic member 52 moves together with the first bolt 44 towards the rear end of the guide groove 12 along the guide groove 12. Accordingly, the seat back frame 8 rotates in a direction of an arrow B, as shown in FIG. 6C, with the second bolt 46 as a center of rotation, and the headrest 10 moves towards the user's head to support it. FIG. 5 and FIG. 6C depict such a condition.

Rear-end collision tests carried out up to this time revealed that a load applied to the human body is high at the lumbar part first and then becomes high at the chest and at the head. According to the present invention, once the load applied to the lumbar part becomes high, the seat back frame rocking mechanism acts to first move the headrest 10 forward to support the head. Thereafter, when the load applied to the chest or the head becomes high, the elastic member 52 returns to its original position, while absorbing a shock applied to the chest or the head (rebound).

Figure 9:
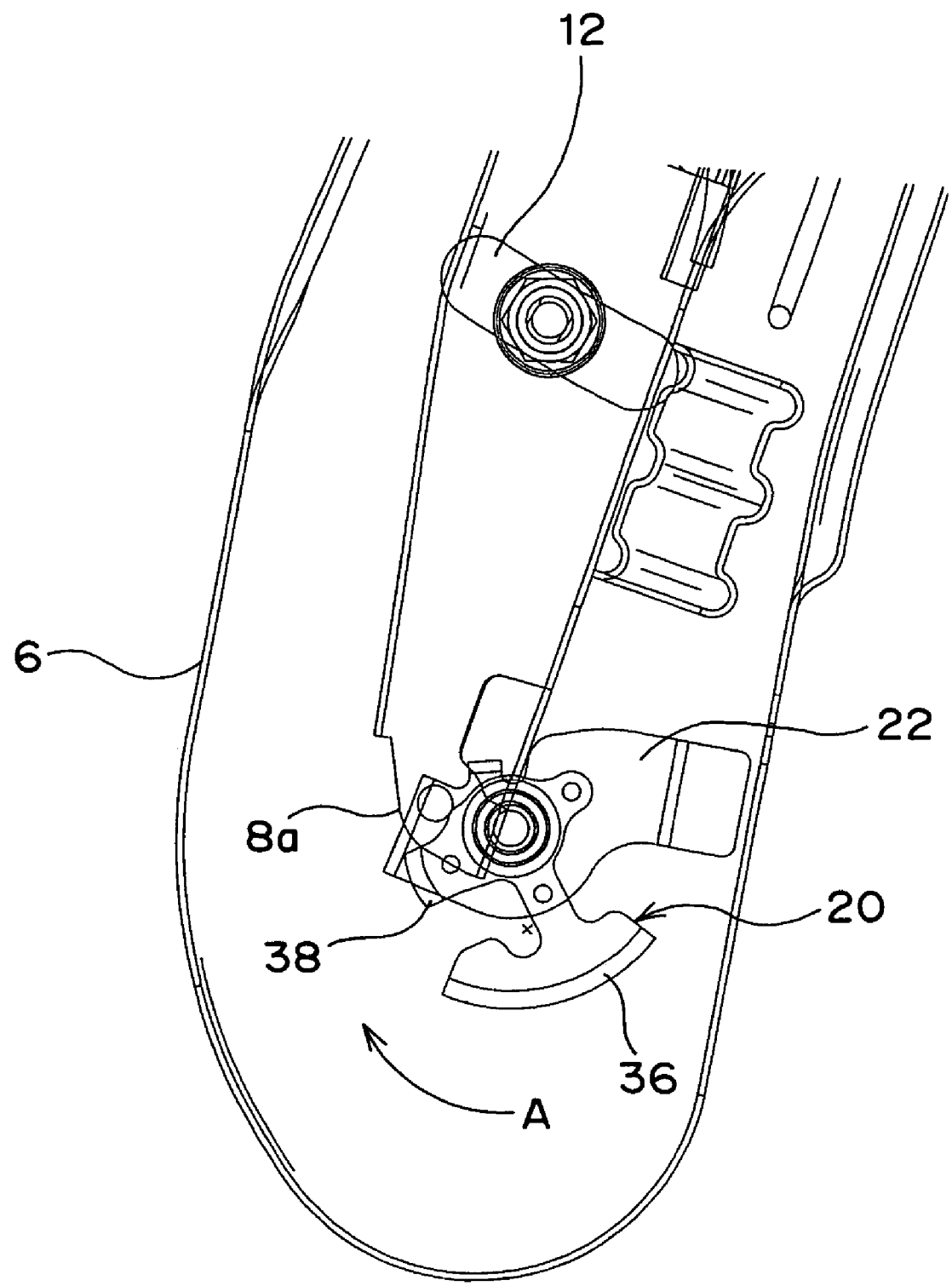
FIG. 9 is a front view of a portion of the side frame when the rocking motion preventing member is returning to its original position after a rear-end collision.

After the rear-end collision has caused the protrusion 58 of the elastic member 52 to leave the depression 16 in the ridge 14, even if a subsequent rebound has not caused the elastic member 52 to return to its original position, the rocking motion preventing member 20 rotates in the direction of the arrow A until a portion of the inwardly protruding portion 38 is brought into contact with a lower edge of the seat back frame 8 by the action of the elastic force of the spiral spring 40, as shown in FIG. 9. Under such a condition, when a lower portion of the seat back is pushed forwards or an upper portion of the seat back is pushed rearwards, the seat back frame 8 rotates about the second bolt 46 in the direction counter to the direction of the arrow B to return to its initial or original posture before the operation (before the rear-end collision).

As shown in FIG. 9, the seat back frame 8 has an arcuate lower edge 8a and, hence, as the seat back frame 8 rotates about the second bolt 46 in the direction counter to the direction of the arrow B, the rocking motion preventing member 20 rotates in the direction of the arrow A until an upper edge of the base 34 is brought into contact with the inwardly protruding portion 28 of the guide 22 while a portion of the inwardly protruding portion 38 is held in sliding contact with the lower edge 8a of the seat back frame 8. In this way, the rocking motion preventing member 20 returns to its initial posture before the operation.

The elastic force of the spiral spring 40 is appropriately selected such that upon input of an impact greater than a predetermined value in the event of a rear-end collision, the rocking motion preventing member 20 is operated against the elastic force of the spiral spring 40, while the rocking motion preventing member 20 is not operated by, for example, vibration inputted under normal sitting conditions.

Further, under a condition in which the seat back frame 8 is largely inclined rearwardly, even if a large load such as the user's weight is applied to a lower portion of the seat back frame 8, the stopper (inwardly protruding portion 38) of the rocking motion preventing member 20 is brought into contact with a lower end portion of the seat back frame 8 before the seat back frame holding means operates, making it possible to prevent an erroneous operation of the seat back frame 8.

It is to be noted here that although in the above-described embodiment a ridge 14 is formed on each side of the guide groove 12 and a depression 16 for holding the elastic member 52 is formed in the ridge 14, the depression 16 may be formed in the side frame 6 without forming any ridges.

According to the present invention, the operation of the seat back frame rocking mechanism is restricted by the rocking motion preventing member under normal conditions, while when an acceleration greater than a predetermined value is inputted from behind the vehicle body, the restriction of the seat back frame rocking mechanism by the rocking motion preventing member is released. Accordingly, the present invention can be effectively utilized in a reliable automobile seat capable of preventing a seat occupant from suffering a whiplash injury with a simple construction.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile seat, comprising:
a seat cushion frame for a seat cushion;
a pair of side frames tiltably mounted with respect to said seat cushion frame;
a seat back frame mounted on said pair of side frames so as to be rockable within a limited range of angles, said seat back frame having a head rest mounted on an upper portion thereof;
a seat back frame holding device that is operable to elastically hold said seat back frame in an original position with respect to said pair of side frames; and
a seat back frame rocking mechanism for causing, when an acceleration greater than a predetermined value is imparted to said automobile seat from behind said automobile seat, said seat back frame to undergo a rocking motion in which said seat back frame holding device releases said seat back frame from said original position and said seat back frame rocks with respect to said pair of side frames;
wherein said seat back frame rocking mechanism includes a rocking motion preventing member rotatable mounted to one of said pair of side frames and spaced apart from said seat back frame holding device, said rocking motion preventing member (1) preventing said seat back frame from undergoing the rocking motion when the acceleration greater than the predetermined value is not inputted from behind said automobile seat and (2) preventing said seat back frame from undergoing the rocking motion and said seat back frame holding device from releasing said seat back frame so as to prevent erroneous operation in the absence of the acceleration greater than the predetermined value when said pair of side frames are tilted to be inclined rearwardly and a load is applied to said seat back frame;
wherein said rocking motion preventing member comprises a rotatable base, an inertial portion that extends radially outwardly from said base, and a stopper that restricts said seat back frame from undergoing the rocking motion by contacting a lower end portion of said seat back frame, such that when the acceleration greater than the predetermined value is inputted from behind said automobile seat, said rocking motion preventing member rotates due to inertial force of said inertial portion to release said stopper from restricting said seat back frame from undergoing the rocking motion; and
wherein said rocking motion preventing member has said rotatable base, said inertial portion and said stopper mounted together to rotate about a common center of rotation when the acceleration greater than the predetermined value is inputted from behind said automobile seat.

2. The automobile seat of claim 1, and further comprising biasing member biasing said rocking motion preventing member in a first direction toward a position in which the rocking motion is prevented, said biasing member having an elastic force such that when the acceleration greater than the predetermined value is inputted from behind said automobile seat, said rocking motion preventing member moves in a direction counter to the first direction against the elastic force of said biasing member.

3. The automobile seat of claim 2, wherein said rocking motion preventing member is arranged such that after said rocking motion preventing member has released the restriction of said seat back frame to the rocking motion in response to the acceleration greater than the predetermined value being inputted from behind said automobile seat, said rocking motion preventing member is rotated in the first direction under the elastic force of said elastic member, and wherein said seat back frame has a lower edge of a predetermined shape which allows said seat back frame to return to the original position after the rocking motion.

4. The automobile seat of claim 1, wherein said stopper has an arcuate surface confronting said lower end portion of said seat back frame, said arcuate surface having a center of curvature that is offset from a center of rotation of said rocking motion preventing member.

5. The automobile seat of claim 1, wherein said seat back frame holding device comprises an elastic member connected to said seat back frame and having two protrusions formed at opposite ends thereof, and two depressions formed in one of said side frames, said protrusions being engaged with said depressions, respectively.

6. The automobile seat of claim 1, wherein said seat back frame is mounted on said pair of side frames so that when the acceleration greater than the predetermined value is inputted from behind said automobile seat, a lower portion of said seat back frame is pushed by a lumbar part of a seat occupant to cause the rocking motion and move said headrest forwards.

7. The automobile seat of claim 1, wherein said stopper faces said lower end portion of said seat back frame when the acceleration greater than the predetermined value is not inputted and rotates to a position away from said lower end portion of said seat back frame when the acceleration greater than the predetermined value is inputted.

8. The automobile seat of claim 1, wherein said stopper, said base and said inertial portion are fixed with respect to each other.

9. An automobile seat, comprising:

a seat cushion frame for a seat cushion;

a pair of side frames tiltably mounted with respect to said seat cushion frame;

a seat back frame mounted on said pair of side frames so as to be rockable within a limited range of angles, said seat back frame having a head rest mounted on an upper portion thereof;

a seat back frame holding device that is operable to elastically hold said seat back frame in an original position with respect to said pair of side frames;

a seat back frame rocking mechanism for causing, when an acceleration greater than a predetermined value is imparted to said automobile seat from behind said automobile seat, said seat back frame to undergo a rocking motion in which said seat back frame holding device releases said seat back frame from said original position and said seat back frame rocks with respect to said pair of side frames so as to move said headrest forward;

wherein said seat back frame rocking mechanism includes a rocking motion preventing member rotatably mounted to one of said pair of side frames and spaced apart from said seat back frame holding device, said rocking motion preventing member comprising a blocking portion that is operable to contact and block movement of said seat back frame and prevent said seat back frame from undergoing the rocking motion when the acceleration greater than the predetermined value is not inputted from behind said automobile seat and an inertial portion having a weight sufficient to cause said rocking motion preventing member to rotate and move said blocking portion from preventing said seat back frame from undergoing the rocking motion upon application of the acceleration greater than the predetermined value from behind said automobile seat; and wherein said rocking motion preventing member has said inertial portion and said blocking portion mounted together to rotate about a common center of rotation when the acceleration greater than the predetermined value is inputted from behind said automobile seat.

10. The automobile seat of claim 9, wherein said blocking portion faces said lower end portion of said seat back frame when the acceleration greater than the predetermined value is not inputted and rotates to a position away from said lower end portion of said seat back frame when the acceleration greater than the predetermined value is inputted.

11. The automobile seat of claim 9, wherein said blocking portion and said inertial portion are fixed with respect to each other.

* * * * *